3,687,701
THERMOPLASTIC RELEASE COATING
Theodore J. Reinhart, Jr., Dayton, Ohio, assignor to the United States of America as represented by the Secretary of the United States Air Force
No Drawing. Filed Nov. 23, 1970, Ser. No. 92,163
Int. Cl. B44d 1/14, 1/34
U.S. Cl. 117—6    3 Claims

ABSTRACT OF THE DISCLOSURE

A prime coat of thermoplastic release material is applied to the metallic or thermosetting resin surface of an airplane or radome prior to coating the surface with an outer coat of thermosetting, resin-based paint. The thus interposed thermoplastic layer is useful in that it and the outer, thermosetting resin-based paint may be easily removed, at a later time, by the steps of (a) applying heat until the thermoplastic release material softens and (b) scraping or sanding.

BACKGROUND OF THE INVENTION

(1) Field of the invention

This invention relates to a method for rendering a resin-based paint easily removable from a metallic or thermosetting resin surface.

(2) Description of the prior art

It is well known that paint must be periodically removed from certain metallic and thermosetting resin surfaces such as metallic aircraft surfaces and thermosetting resin radome surfaces. Aircraft paint erodes under normal wear and must be periodically stripped to permit application of a new coat of paint. Also, paint must be periodically stripped from certain aircraft parts in order to permit inspection of the underlying surface for cracks and flaws. Periodic inspection of the surfaces of military aircraft is especially necessary because of the nature of the mission of the aircraft. Military aircraft are often placed under extreme strain while in flight. Therefore, their surfaces are especially subject to damage produced by such strain.

It is also well known to paint the metallic and thermosetting resin surfaces of aircraft and radomes with resin-based paints. Among the paints commonly used for this purpose are epoxy-based paints, urethane-based paints, vinyl-based paints, acrylic-based paints, and others. All of the resin-based paints commonly used on aircraft and radome surfaces have two things in common. Firstly, the resins used therein are thermosetting. Thermosetting resins are used because they, in general, provide better weather resistance, better chemical resistance, and are more stable to ultraviolet light than are thermoplastic resins. Secondly, resins commonly used in aircraft paints are all well known to be difficult to remove from a surface once they are applied.

Many compositions, commonly called paint removers or paint strippers, have been developed to facilitate the removal of resin-based paints from aircraft and radome surfaces. The paint stripper compositions generally rely on a chemical reaction between one or more components of the remover and one or more components of the paint to produce a softening action which permits the paint to be scraped or sanded from the surface. The use of paint stripper compositions to remove paint from aircraft and radome surfaces poses three problems to the user. Firstly, their use usually requires long and tedious work. Secondly, the user must be extremely careful to keep excessive amounts of the composition from coming into direct contact with the surface being stripped lest the composition react chemically with the surface and cause damage thereto. Thirdly, the user must be careful not to come into direct contact with the stripper composition himself lest he receive physical injury therefrom. Some components of commonly used paint removers are capable of being absorbed into a person's body through the skin and are extremely toxic.

Finally, the use of epoxy resins in paints is well known. There are, in general, four types of epoxy-based paints. One type is commonly called an unmodified epoxy baking resin. Paints of this type are formulated from unmodified (unesterified), high molecular weight, epoxy resins and, after application on a surface, are heated (baked) to effect a cure. A second type is commonly called an unmodified epoxy air-dry resin. This type of paint, like the baking resins, is formulated from unesterified, high molecular weight epoxy resins. The primary difference between air-dry resins and baking resins is in the method of effecting the cure. Air-dry resins utilize cross-linking agents such as amines to effect the cure. Therefore, they do not have to be baked into place. A third type of epoxy-based paint is called an esterified epoxy resin. These resins have a portion of their hydroxy groups esterified. Esterification is generally accomplished by reacting the unmodified resin with a fatty acid. Esterified epoxy resins have been utilized in both baking and air-drying paints. The fourth general type of epoxy-based paint is the epoxy-polyamide type. This type utilizes polyamide-epoxy copolymers as the base. All of the four types of epoxy-based paints have one thing in common. They are all thermosetting. That is, the addition of heat, even to the air-drying epoxies, causes them to become even more infusible and insoluble. Also, once applied to a surface, they are extremely resistant to chemical paint removers.

SUMMARY OF THE INVENTION

It has now been found that thermosetting resin-based paints may be easily removed from metallic and thermosetting resin surfaces if use is made of a prime coat of a thermoplastic, epoxy release material which has been formulated to soften at temperatures of from about 30° F. to about 60° F. above the highest temperature that the surface is expected to encounter under normal conditions. Interposition of the epoxy-based thermoplastic release material between a metallic or thermosetting resin surface and an outer coat of thermosetting resin-based paint permits later removal of the paint by a process which comprises (1) heating the outer thermosetting resin-based paint to a temperature high enough to cause the interposed thermoplastic material and soften it and then (2) scraping or sanding away both the softened prime coat and the paint. The thermoplastic prime coats of this invention are easily removed, along with the outer thermosetting resin-based paint, in the removal process described above. Also, their use in prime coats does not defeat the purposes of the outer, thermosetting coat because, as primers, they are not exposed to the chemical, weather, and light conditions that the outer coat is exposed to.

DESCRIPTION OF THE PREFERRED EMBODIMENTS

The highest temperatures encountered by subsonic aircraft are reached when the aircraft are parked, on the ground, in desert regions. The surface temperature of an airplane parked on the ground in a desert region may reach the 140° F. to 150° F. range. Therefore, thermoplastic release materials to be used as prime coating materials for subsonic aircraft should be fabricated to soften at temperatures of from about 180° F. to about 200° F.

A softening point of at least about 180° F. is necessary in order to prevent softening under normal conditions.

The thermoplastic release materials utilized in the methods of this invention are epoxy-based thermoplastic materials. Epoxies are preferred because of their superior toughness and because of their exceptional adhesive qualities. Also, aircraft, and in particular military aircraft, are often required to undergo extreme differences in weather conditions. That is, a military airplane may be surrounded by a hot, steaming jungle one day and in the cold, dry antarctic or arctic the next day. It has been found that epoxies are especially adaptable to such changes in conditions because, in comparison to other resins, they are more flexible. That is, when contracted by cold or expanded by heat, epoxies still maintain their adhesive properties.

The following are specific examples which describe the formulation and application of thermoplastic epoxy-based prime coats, the application of thermosetting outer coats of resin-based paints and the removal, at a later time, of both the prime coats and the outer coats.

Example I 95 grams of bisphenol A epoxy resin which may be represented by the formula:

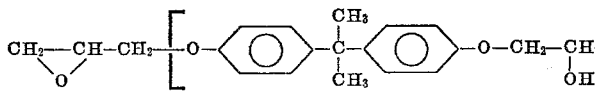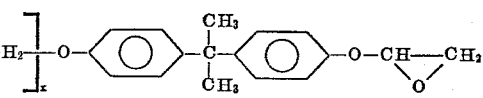

wherein $x$ is an integer having a value of from about 1 to about 25, was mixed and reacted with 5 grams of diethylene triamine. All 100 grams of the mixture were then dissolved in enough acetone to yield one quart of lacquer solution. The lacquer contained about 20 weight percent of solids.

A panel of fiberglass reinforced thermosetting epoxy resin laminate, of the type normally used in radomes, was lightly sanded and then sprayed with the above described lacquer. The acetone evaporated after spraying leaving a dry coat of thermoplastic material on the fiberglass reinforced epoxy resin surface. The coat had a thickness of about .005 inch and adhered very tightly to the laminate surface.

Example II

The coated panel, from Example I, was sprayed with a commercially available, thermosetting, urethane-based aircraft paint. After coating with the paint, the panel was air dried for 48 hours in order that the last vestiges of any remaining solvent, either from the thermoplastic release layer or from the urethane-based, thermosetting paint layer would evaporate. The urethane-based coat had a thickness of about .020 inch.

Example III

The outer, urethane-based paint coat, of the panel from Example II, was heated with a hot air gun. When enough heat had been conducted through the outer thermosetting coat into the underlying thermoplastic coat, to raise its temperature to from about 180° F. to about 200° F., the thermoplastic coat softened. The softening was accompanied by a buckling action which caused portions of both the thermoplastic coat and urethane-based coat to raise away from the laminate surface. The buckled coats were then easily scraped away from the laminate surface with a paint scraper.

Example IV

A panel of laminated material of the type used in Examples I, II, and III was painted with a coat of thermosetting urethane-based aircraft paint of the type described in Example II. The paint coated laminate was then subjected to heat as in Example III. Even when the surface temperature of the urethane-based coat was raised considerably above 200° F., the heat had no noticeable effect. The urethane-based paint could not be physically removed from the panel surface.

Example V

The techniques of Examples I, II, and III were repeated using a panel of aluminum material, of a type commonly used to fabricate aircraft surfaces, in lieu of the laminated plastic panel of Example I. Upon heating the thermoplastic material to a temperature of from about 180° F. to about 200° F., the material softened and buckled and could be easily scraped from the surface as in Example III.

Unlike those of subsonic aircraft, the surfaces of supersonic aircraft are often subjected to the most rigorous temperature conditions while in flight. Because of air friction, the surface temperatures encountered by supersonic aircraft, flying at speeds of Mach II and higher, often reach 250° F. or more. For this reason, prime coats of thermoplastic material which are to be used on supersonic aircraft should be fabricated to soften at temperatures of from about 280° F. to about 300° F. Thus, while one specific prime coat composition is given above for illustrative purposes, it will be obvious to those skilled in the art that the fabrication of the prime coat must depend upon what conditions the surface to be painted is likely to encounter.

A softening range of from 30° F. to 60° F. above the highest expected in use temperature is preferable for the following reasons. Firstly, less than a 30° difference between the highest expected in use temperature and the lowest softening point of the prime coat would not permit enough leeway to allow for error in judgement as to what the highest normally encountered temperature would be. Secondly, any more than a 60° F. difference between the softening point of the thermoplastic release coat and the highest normally encountered temperature would merely require excessive heating of the surface during paint removal and would serve no useful purpose.

In formulating thermoplastic prime coatings which soften in the 180° F. to 200° F. range described above, a range of from about 93 weight percent to about 97 weight percent of epoxy may be utilized with from 7 weight percent to 3 weight percent of the amine curing agent. Other epoxides, such as those resulting when unsaturated fatty acids are epoxidized, may be used in lieu of the bisphenol A epoxy resin described above. Other amine curing agents such as pyridine, piperidine, and ethylenediamine may be used in lieu of the diethylene triamine disclosed above. Solvents which may be used in lieu of the acetone disclosed above include other ketones, chlorinated solvents such as methylene chloride and trichloroethylene and alcohols such as isopropyl alcohol.

As made clear above, the prime coat must meet certain criteria. It must be thermoplastic and soften at a temperature of from about 30° F. to about 60° F. above the highest temperature that the surface to be painted will normally encounter. It must be soluble in an organic, lacquer or varnish type solvent in order that it can be coated onto the surface to be painted. And it must adhere tightly to the surface upon drying.

Other outer, resin-based paints may be used in lieu of the urethane-based paint of the examples. An epoxy-based thermoplastic release coat used to provide for the later removal of a resin-based outer coat will work equally well with thermosetting epoxy-based paints, thermosetting vinyl-based paints, thermosetting acrylic-based paints, and other resin-based paints commonly used in the aircraft industry.

The use of a thermoplastic prime coat to provide for the later removal of a resin-based paint may be utilized on metallic and thermosetting resin surfaces other than the laminate and aluminum surfaces described in the examples. For example, many aircraft parts are fabricated from steel and various alloys. It is, of course, necessary that the surface to be painted have a melting point somewhat higher than the softening point of the thermoplastic release layer in order that it not be adversely affected when heated during the removal operation.

I claim:

1. A method of protecting the metallic or thermosetting resin surfaces of an aircraft or radome with an easily removable thermosetting, resin-based paint, said method comprising the steps of:

(1) applying to a surface of an aircraft or radome, said surface being an aluminum surface or a surface of a fiberglass reinforced epoxy resin laminate, a prime coat of a thermoplastic release material formulated from 95 parts by weight of bisphenol A epoxy resin and 5 parts by weight of diethylene triamine, said thermoplastic release material having a softening point of from 30 to 60° F. higher than the temperature to be encountered by said surface; and (2) applying to said prime coat an outer coat of a thermosetting, resin-based paint.

2. The method according to claim 1 in which said outer coat is removed from said surface which comprises heating said outer coat until enough heat is conducted therethrough to heat said thermoplastic material to above its softening point temperature; and removing from said surface the coat of thermoplastic material together with said outer coat of thermosetting, resin-based paint.

3. The method according to claim 1 wherein said prime coat of thermoplastic release material softens at a temperature of from about 180° F. to about 200° F.

References Cited

UNITED STATES PATENTS 3,055,777   9/1962   Grad _____ 117—5.5 X

WILLIAM D. MARTIN, Primary Examiner

T. G. DAVIS, Assistant Examiner

U.S. Cl. X.R.

117—72, 75, 126 GE, 132 A, 132 BE, 132 C, 138.8 A, 161 ZB